(12) United States Patent
Mcguinness et al.

(10) Patent No.: US 11,436,069 B2
(45) Date of Patent: Sep. 6, 2022

(54) METHOD AND APPARATUS FOR PREDICTING HARD DRIVE FAILURE

(71) Applicant: Dell Products L.P., Round Rock, TX (US)

(72) Inventors: Patrick Mcguinness, Austin, TX (US); Nagendra-Vikas Kamath, Austin, TX (US); Elmira M. Bonab, Austin, TX (US); WeiTa Chen, Pflugerville, TX (US); Joe Ray, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 245 days.

(21) Appl. No.: 16/864,766

(22) Filed: May 1, 2020

(65) Prior Publication Data

US 2021/0342205 A1 Nov. 4, 2021

(51) Int. Cl.
*G06F 11/00* (2006.01)
*G06F 11/07* (2006.01)
*G06F 11/30* (2006.01)
*G06K 9/62* (2022.01)
*G06F 3/06* (2006.01)

(52) U.S. Cl.
CPC .......... *G06F 11/008* (2013.01); *G06F 3/0616* (2013.01); *G06F 3/0653* (2013.01); *G06F 3/0683* (2013.01); *G06F 11/0772* (2013.01); *G06F 11/3058* (2013.01); *G06K 9/6256* (2013.01)

(58) Field of Classification Search
CPC ............. G06F 11/3409; G06F 11/3457; G06F 11/3058; G06F 11/3434; G06F 11/008; G06F 11/0772
See application file for complete search history.

(56) References Cited

U.S. PATENT DOCUMENTS

| | | | |
|---|---|---|---|
| 10,048,996 B1* | 8/2018 | Bell | G06F 11/3006 |
| 10,769,006 B2* | 9/2020 | Kao | G06N 20/00 |
| 2021/0182133 A1* | 6/2021 | Donegan | G06Q 10/20 |

* cited by examiner

*Primary Examiner* — Nadeem Iqbal
(74) *Attorney, Agent, or Firm* — Daly, Crowley Mofford & Durkee, LLP

(57) ABSTRACT

A method is provided, comprising: retrieving telemetry data from a first storage device; generating a failure risk score for the first storage device, the failure risk score being generated by using a failure inference engine, the failure inference engine being arranged to execute a predictive failure model for calculating the failure risk score; and outputting the failure risk score for use in servicing the first storage device.

17 Claims, 5 Drawing Sheets

| 300 FAILURE RISK RANGE | PREEMPTIVE MAINTENANCE ACTION | |
|---|---|---|
| $R_1 - R_2$ | NO ACTION | 310A |
| $R_3 - R_4$ | ACTION_1 | 310B |
| $R_5 - R_6$ | ACTION_2 | 310C |

METHOD AND APPARATUS FOR PREDICTING HARD DRIVE FAILURE

BACKGROUND

A storage device failure occurs when a storage device malfunctions and the information on it becomes lost. Data loss can have a very disruptive effect on private users and businesses alike. In some systems, data loss can be prevented by deploying redundant storage arrays and establishing extensive data backup and data-loss prevention policies.

SUMMARY

According to aspects of the disclosure, a method is provided, comprising: retrieving telemetry data from a first storage device; generating a failure risk score for the first storage device, the failure risk score being generated by using a failure inference engine, the failure inference engine being arranged to execute a predictive failure model for calculating the failure risk score; and outputting the failure risk score for use in servicing the first storage device.

According to aspects of the disclosure, a system is provided, comprising: a storage device; and at least one processor operatively coupled to the storage device, the at least one processor being configured to perform the operations of: retrieving telemetry data from a storage device; generating a failure risk score for the storage device, the failure risk score being generated by using a failure inference engine, the failure inference engine being arranged to execute a predictive failure model for calculating the failure risk score; and outputting the failure risk score for use in servicing the storage device.

According to aspects of the disclosure, a non-transitory, computer-readable medium is provided that stores one or more processor-executable instructions, which when executed by at least one processor further cause the at least one processor to perform the operations of: retrieving telemetry data from a first storage device; generating a failure risk score for the first storage device, the failure risk score being generated by using a failure inference engine, the failure inference engine being arranged to execute a predictive failure model for calculating the failure risk score; and outputting the failure risk score for use in servicing the first storage device.

BRIEF DESCRIPTION OF THE DRAWINGS

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
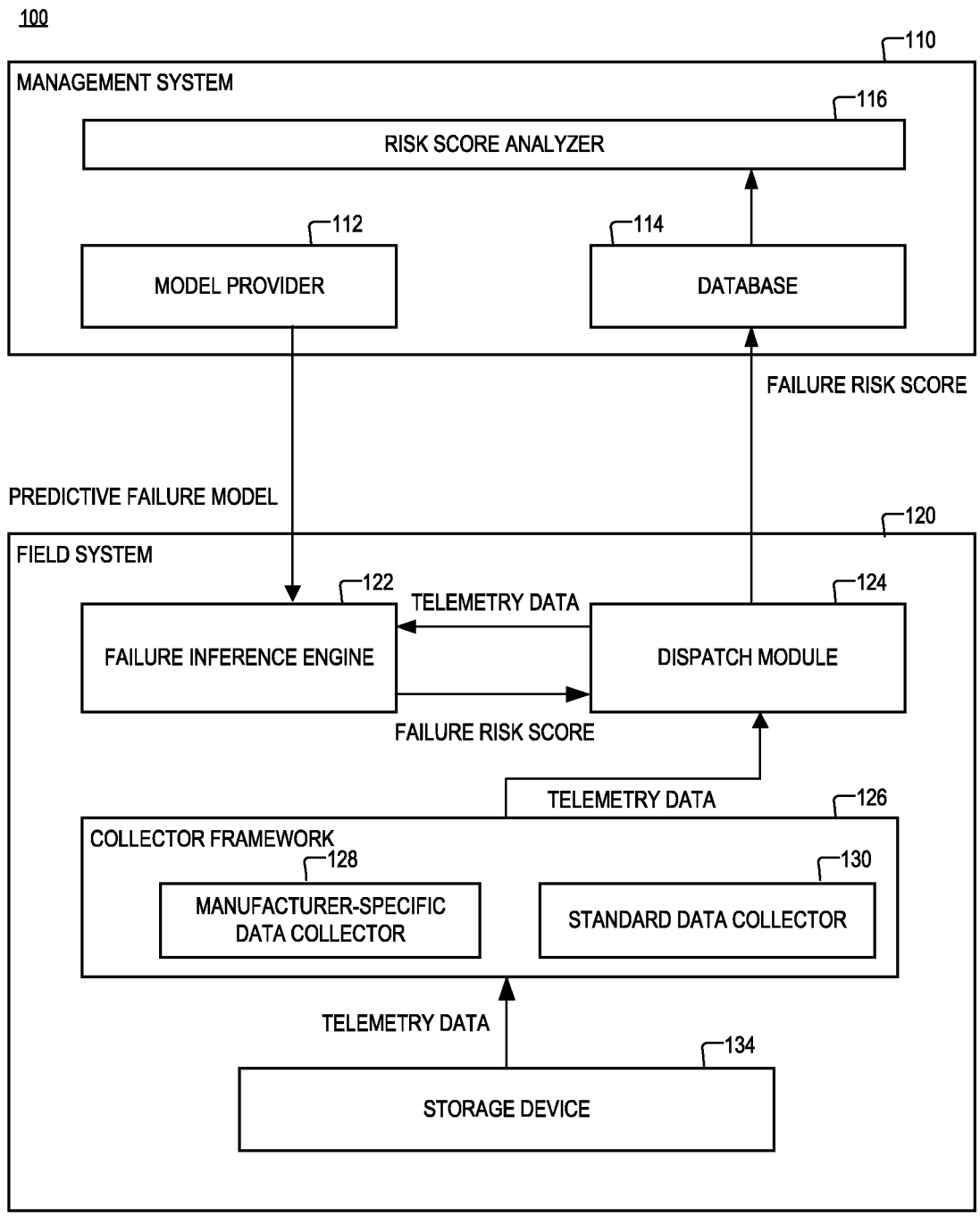
FIG. 1 is a diagram of an example of a system, according to aspects of the disclosure.

FIG. 1 is a diagram of an example of a system 100, according to aspects of the disclosure. As illustrated, the system 100 may include a management system 110 and a field system 120. The field system 120 may include a laptop computer, a desktop computer, a smartphone, a data center, and/or any other computing device or system where one or more storage devices are deployed. The management system 110 may include one or more computing devices that are configured to monitor the status of the storage devices deployed at the field system 120 and preemptively schedule service for the storage devices when it is determined that the storage devices are likely to fail. Additionally or alternatively, in some implementations, any of the management system 110 and the field system 120 may include one or more computing devices, such as the computing device 700, which is discussed further below with respect to FIG. 7. In some implementations, the management system 110 and the field system 120 may be connected to one another via a communications network, such as a Local Area Network (LAN), a Wide Area Network (WAN), the Internet, and/or any other suitable type of communications network.

The management system 110 may include a model provider 112, a database 114, and a risk score analyzer 116. The model provider 112 may include logic that is arranged to train a predictive failure model and provide the predictive failure model to the field system 120. The predictive failure model may receive, as input, telemetry data that is produced by a storage device 134 (which is part of the field system 120) and calculate, based on the telemetry data, a failure risk score that indicates the likelihood of the storage device 134 failing. The database 114 may be arranged to store one or more of: (i) telemetry data that is obtained from the storage device 134 and/or (ii) a failure risk score that is calculated based on the telemetry data. The telemetry data and the failure risk score may be received at the database from the field system 120. The risk score analyzer 116 may include logic that is configured to (i) retrieve (from the database 114) a failure risk score for a storage device 134 and (ii) determine whether a preemptive maintenance action needs to be executed for the storage device 134.

The field system 120 may include a failure inference engine 122, a dispatch module 124, a collector framework 126, and a storage device 134. The failure inference engine 122 may include logic configured to execute the predictive failure model that is provided by the model provider 112. The dispatch module 124 may include logic that is configured to distribute data between the failure inference engine 122 and the database 114. The collector framework 126 may include logic that is configured to retrieve telemetry data from the storage device 134. The storage device 134, according to the present example, includes a hard disk (HD). However, alternative implementations are possible in which another type of storage device, such as a solid-state drive or a non-volatile random-access memory (nvRAM) device.

The collector framework 126 may include a manufacturer-specific data collector 128 and a standard data collector 130. The manufacturer-specific data collector 128 may include logic that is configured to retrieve, from the storage device 134, manufacturer-specific telemetry data that is stored in one or more data logs that are maintained on the storage device 134. The standard data collector 130 may be configured to retrieve, from the storage device 134, standard telemetry data that is stored in one or more data logs that are maintained on the storage device 134.

The difference between manufacturer-specific telemetry data and standard telemetry data is now described in further detail. The controllers of most storage devices collect telemetry data over the course of their operation and store the collected telemetry data in data logs. Some of the collected data can be made available to the outside world via standard diagnostic interfaces, such as the Self-Monitoring, Analysis, and Reporting Technology (SMART) interface. Such data is generally made available to the broad public, and is herein referred to as "standard telemetry data." By way of example, standard telemetry data may include read error rate, throughput performance, spin-up time, seek error rate, seek time performance, power-on hours, Solid-State Drive (SSD) erase fail count, SSD wear-leveling count, erase fail count, wear range delta, high fly writes, G-sense error rate, reallocation event count, current pending center count, etc.

On the other hand, some information that is logged by the controller of a storage device may not be publicly available. Such information may be collected for research and development purposes, troubleshooting purposes, and/or other uses that are internal to the manufacturer of the storage device, and is herein referred to as "manufacturer-specific telemetry data". Manufacturer-specific telemetry can be accessed by third-parties by providing, to the controller of a storage device, a cryptographic code (and/or another code or password) that is supplied by the manufacturer of the storage device. By way of example, manufacturer-specific data may include G-list data, fly height, drive temperature, duty cycle, rotational vibration (RV), non-repeatable runout (NRRO), etc. In some implementations, manufacturer-specific telemetry data may include a type of data that is not accessible via standard protocols, such as SMART, and which requires authorization from the manufacturer of a storage device in order to be retrieved. Moreover, manufacturer-specific telemetry data may also include the same type of data as any of the types of data that are available via standard protocols, such as SMART. However, unlike standard telemetry data, the manufacturer-specific data may have higher fidelity (e.g., higher resolution, more detail, etc.) or it may be kept proprietary by the manufacturer and not exposed via standard protocols/interfaces, such as SMART.

According to the present disclosure, it has been discovered that using manufacturer-specific telemetry data to train and/or execute a predictive failure model can increase the accuracy at which the model predicts the likelihood of a storage device failing. In some implementations, the manufacturer-specific data collector 128 may obtain manufacturer-specific telemetry data from the storage device 134 by providing a code (e.g., a cryptographic key) to a controller of the storage device 134. The controller may attempt to authenticate the code, and if the authentication is successful, the controller may begin providing manufacturer-specific telemetry data to the manufacturer-specific data collector 128. On the other hand, if the authentication is unsuccessful, the controller of the storage device 134 may decline subsequent attempts to retrieve manufacturer-specific data from the storage device 134. As noted above, the cryptographic code may be supplied by the manufacturer of the storage device.

In some implementations, storage devices that are made by different manufacturers may support different sets (and/or types) of manufacturer-specific telemetry data. For example, a storage device that is made by one manufacturer may be configured to provide one or more first types of manufacturer-specific telemetry data, whereas a storage device that is made by another manufacturer may be configured to provide one or more second types of manufacturer-specific telemetry data that are different from the first types. Additionally or alternatively, in some implementations, different models of storage devices that are made by the same manufacturer may support different sets (and/or types) of manufacturer-specific telemetry data. For example, a first model of a storage device (that is made by a manufacturer) may be configured to provide one or more first types of manufacturer-specific telemetry data, whereas a second model of storage device (that is made by the same manufacturer) may be configured to provide one or more second types of manufacturer-specific telemetry data that are different from the first types.

According to aspects of the disclosure, the model provider 112 may tailor the predictive failure model specifically to the type of the storage device 134 (e.g., specifically to the manufacturer of the storage device, specifically to the model of the storage device, etc.). In some implementations, the model provider 112 may have at its disposal (e.g. stored in the memory of the model provider 112 and/or management system 110) a plurality of predictive failure models, wherein each of the predictive failure model is trained, at least in part, based on a different manufacturer-specific telemetry data set. In such implementations, the model provider 112 may: (i) receive, from the field system 120, an identifier corresponding to the model and/or manufacturer of the storage device 134, (ii) identify, based on the identifier, a type of manufacturer-specific telemetry data that is supported by the storage device 134, (iii) select one of the plurality of predictive failure models that is trained based on manufacturer-specific telemetry, which is supported by the storage device 134, and (iv) provide the selected predictive failure model to the failure inference engine 122.

Additionally or alternatively, in some implementations, the model provider 112 may have at its disposal (i.e. stored in the memory of the model provider 112) a plurality of training data sets. Each of the training data sets may include different manufacturer-specific telemetry data. In such implementations, the model provider 112 may: (i) receive, from the field system 120, an identifier corresponding to the model and/or manufacturer of the storage device 134, (ii) identify, based on the identifier, a type of manufacturer-specific telemetry data that is supported by the storage device 134, (iii) select one of the plurality of training data sets that includes manufacturer-specific training data that is supported by the storage device 134, (iv) train a predictive failure model based on the training data set, and (v) provide the selected training model to the failure inference engine 122. In some implementations, the identifier corresponding to the model and/or manufacturer of the storage device may include a serial number of the storage device and/or any other suitable type of identifier.

As used throughout the disclosure, the phrase "providing a predictive failure model" may refer to providing a representation of the model. In some implementations, the representation of the model may be formatted in accordance with the Open Neural Network Exchange (ONNX) format. The ONNX format model can be read and run in various environments, including a Windows 10 TM machine using Win10 model run engine, a docker container running within a data appliance, or in a cloud-hosted web service wrapping the model inference engine with a web API. Although in the example of FIG. 1 the failure inference engine 122 is executed on the field system 120, alternative implementations are possible in which the failure inference engine 122 is executed on a separate device. In some implementations, the failure inference engine may be implemented as a web service that is configured to receive telemetry data from the storage device 134 and execute the predictive failure model based on the received telemetry data. Although in the present example the predictive failure model is represented by using the ONNX format, it will be understood that the present disclosure is not limited to any specific representation of the predictive failure model.

According to the present example, each of the risk score analyzer 116, the model provider 112, the database 114, the failure inference engine 122, the dispatch module 124, the collector framework 126 is implemented in software. However, it will be understood that alternative implementations are possible in which any of the risk score analyzer 116, the model provider 112, the database 114, the failure inference engine 122, the dispatch module 124, the collector framework 126 is implemented in hardware or as a combination of hardware and software.

In operation, the model provider 112 may generate (e.g., train) a predictive failure model for the storage device 134 and provide the predictive failure model to the failure inference engine 122. In some implementations, the predictive failure model may be trained based on manufacturer-specific telemetry data that is supported by the storage device 134. The training data may be obtained from other storage devices that support the same manufacturer-specific telemetry data as the storage device 134. The collector framework 126 may obtain telemetry data from the storage device 134 and provide the telemetry data to the dispatch module 124. The dispatch module 124 may provide the telemetry data to the failure inference engine 122. The failure inference engine 122 may include the predictive failure model based on the telemetry data to produce a failure risk score for the storage device 134, which is subsequently provided to the dispatch module 124. The dispatch module 124 may then store the failure risk score, as well as the telemetry data used as a basis for generating the failure risk score, into the database 114. Afterwards, the risk score analyzer 116 may retrieve the failure risk score (and optionally the telemetry data) and determine whether the storage device 134 needs to be serviced (e.g., replaced, repaired, or otherwise maintained, etc.). For instance, if the failure risk score is above a threshold (or within a first range), the risk score analyzer 116 may determine that the storage device 134 is at risk of failing, and it may execute a preemptive maintenance action for the storage device 134. On the other hand, if the failure risk score is below the threshold (or within a second range), the risk score analyzer 116 may take no further action. In some implementations, the threshold can be determined based on statistics associated with historic anomaly scores, as abnormal risk scores follow different statistics than that of normal risk scores.

Stated succinctly, in some implementations, the model provider 112 may provide to the failure inference engine 122 a predictive failure model that is trained based on manufacturer-specific telemetry data that is supported by the storage device 134. The failure inference engine 122 may execute the predictive failure model based on manufacturer-specific telemetry data that is provided by the storage device 134. As a result of executing the predictive failure model, the failure inference engine 122 may calculate a failure risk score for the storage device 134, which indicates the likelihood of the storage device 134 failing. After the failure risk score is calculated, the failure inference engine 122 may provide the failure risk score to the risk score analyzer 116. Upon receiving the failure risk score for the storage device 134, the risk score analyzer 116 may execute a preemptive maintenance action for the storage device 134.

The predictive failure model may be trained by using a supervised learning algorithm and/or any other suitable type of training algorithm, such as an unsupervised anomaly detection algorithm that is arranged to detect anomalous behavior of storage devices by training on historic non-anomalous processed data of manufacturer-specific storage devices. The predictive failure model may be arranged to learn the behavior of a storage device telemetry and to detect major degradation patterns of the storage device that result in failure or imminent failure. The predictive failure model may be arranged to detect the likelihood of failure of a storage device based on small deviations in different operational parameters of the storage device. This is in contrast to some existing rule-based systems for monitoring the health of storage devices, in which small deviations of operational parameters are less likely to trigger an alert that a storage device is likely to fail.

The failure risk score may include any number, string, or alphanumerical string that indicates whether the storage device 134 is likely to fail. In some implementations, the failure risk score may include a number between 0 and 1. If the number is between 0 and 0.6 this may indicate that the storage device is not at risk of failing. On the other hand, if the number is greater than 0.6, this may indicate that the storage device 134 is positively at risk of failing. Additionally or alternatively, in some implementations, the predictive failure score may be a discrete variable having one of the following values: "healthy", "about to fail", and "verified failed." Stated succinctly, the present disclosure is not limited to any specific implementation of the failure risk score.

The preemptive maintenance action (that is executed based on the failure risk score) may include any suitable type of action for preventing a data loss that might result from a failure of the storage device 134. In some implementations, the preemptive maintenance action may include removing the storage device 134 from a RAID array (which the storage device 134 is part of) and rebuilding the RAID array. Additionally or alternatively, in some implementations, the preemptive maintenance action may include scheduling an appointment for a service technician to go on-site of the field system 120 and replace the storage device 134 with a new unit. Stated succinctly, the present disclosure is not limited to any specific type of preemptive maintenance action.

Figure 2:
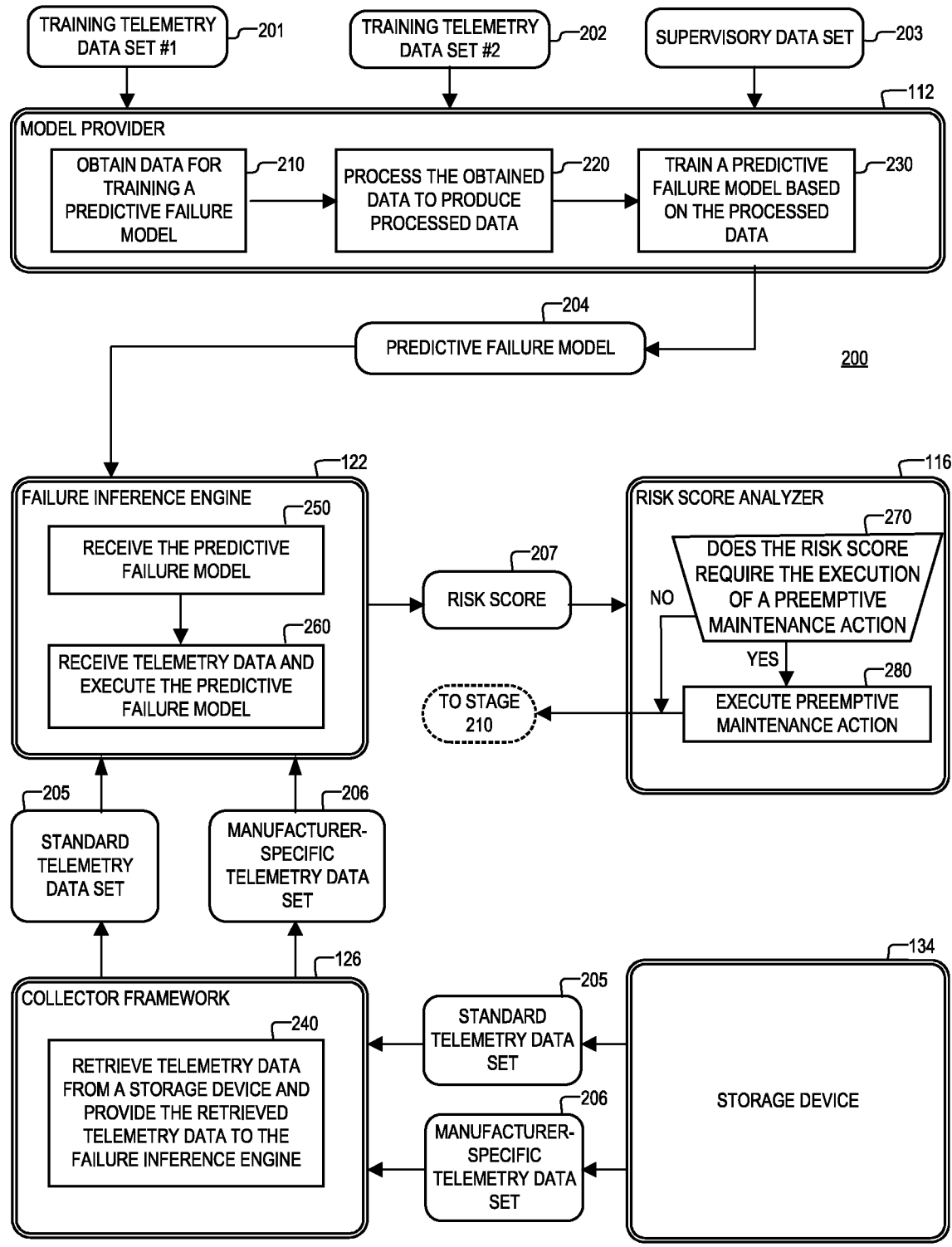
FIG. 2 is a diagram illustrating a data processing pipeline that is implemented by the system of FIG. 1, according to aspects of the disclosure.

Although in the example of FIG. 2, the predictive failure model is executed by the field system 120, alternative implementations are possible in which the predictive failure model is executed by the management system 110 (based on manufacturer-specific telemetry data) that is provided by the field system 120. Although in the example of FIG. 2 the collector framework includes a manufacturer-specific data collector 128 and a standard data collector 130, alternative implementations are possible in which the collector framework 126 includes a proprietary data collector (which is proprietary to the operator of the field system 120 and/or the management system 110), a third-party data collector, and a vendor-provided data collector (which is provided by the manufacturer of the storage device). Additionally or alternatively, in some implementations, the manufacturer-specific data collector 128 may be provided by a manufacturer of the storage device 134. Additionally or alternatively, in some implementations, the manufacturer-specific data collector may be integrated into the collector framework 126 as a plug-in or an API that is called from within the collector framework 126.

FIG. 2 is a schematic diagram illustrating a data processing pipeline 200 that is implemented by the system 100, according to aspects of the disclosure.

At stage 210, the model provider 112 obtains data for training a predictive failure model. The data may include one or more of: (i) a training telemetry data set 201, (ii) a training telemetry data set 202, and (iii) a supervisory data set. The training telemetry data set 201 may include manufacturer-specific telemetry data that is supported by the storage device 134. The training telemetry data set 202 may include standard telemetry data. The supervisory data set 203 may include a data set that is used to verify the accuracy of failure risk scores (which are generated during the training of a predictive failure model). In some implementations, the supervisory data set 203 may be derived from testing performed at a storage device maintenance facility over the course of diagnosing and repairing storage devices. In some implementations, the training data may include both anomalous training data (e.g., training data obtained from storage devices that have failed) and non-anomalous training data (e.g., training data obtained from storage devices that have not failed). Additionally or alternatively, in some implementations, the number of storage devices used for training may be in the hundreds of thousands and the training data may include millions of data points.

In some implementations, the training telemetry data set 201 may include a plurality of portions, wherein each portion is obtained from a different training storage device. Additionally or alternatively, in some implementations, the training telemetry data set 202 may include a plurality of portions, wherein each portion is obtained from a different training storage device. In some implementations, the supervisory data set 203 may map each of the portions of the training telemetry data sets 201 and/or 202 to an in indication of whether a training storage device from which the portion is obtained is healthy. Additionally or alternatively, in some implementations, the supervisory data set may map each of the portions of the training telemetry data sets 201 and/or 202 to a correct failure risk score for the training storage device from which the portion is obtained.

At stage 220, the model provider 112 processes the data (obtained at stage 210) to produce processed data. In some implementations, processing the obtained data may include normalizing each (or at least one) of the training telemetry data set 201, the training telemetry data set 202, and the supervisory data set 203. Additionally or alternatively, in some implementations, processing the data may include imparting a uniform sampling rate on the training telemetry data sets 201 and 202. Imparting a uniform sampling rate on the training telemetry data sets 201 and 204 may include identifying: (i) a plurality of time windows (e.g., contiguous, fixed-size and non-overlapping time windows), and (ii) initializing and a plurality of samples (e.g., sample frames, etc.), wherein each of the samples is associated with a different one of the time windows. After the samples are identified, each of the samples may be populated with data from at least one of the training telemetry data sets 201 and 202 that is generated (and/or recorded by a training storage device) during the sample's respective time window. If any of the training telemetry data sets 201 and 202 lacks data that is generated during the sample's time window, that data can be estimated (and subsequently inserted into sample) by using interpolation or another similar technique. Additionally or alternatively, in some implementations, after a uniform sampling rate is imparted on the training data, any of the portions of the training data that are incomplete may be removed. Additionally or alternatively, in some implementations, portions of the training data that are associated with healthy training storage devices may be over-sampled (e.g., with a 1:100 ratio).

At stage 230, the model provider 112 trains a predictive failure model 204 based on the processed data and provides it to the field system 120 (and/or the failure inference engine 122). As noted above, in some implementations, the predictive failure model 204 may be trained by using a training algorithm, which is executed based on at least one of the training telemetry data sets 201 and 202, as well as the supervisory data set 203. In some implementations, the predictive failure model may be trained based on both anomalous and non-anomalous processed telemetry data across one or more storage devices.

At stage 240, the collector framework 126 retrieves, from the storage device 134, a standard telemetry data set 205 and a manufacturer-specific telemetry data set 206. The standard telemetry data set 205 may be retrieved by the standard data collector 130 and the manufacturer-specific telemetry data set 206 may be retrieved by the manufacturer-specific data collector 128. After the standard telemetry data set 205 and the manufacturer-specific telemetry data set 206 are obtained from the storage device 134, they are forwarded, by the collector framework 126, to the failure inference engine 122.

At stage 250, the predictive failure model 204 is received at the field system 120, and the failure inference engine 122 is configured to execute the predictive failure model 204. In some implementations, configuring the failure inference engine 122 to execute the predictive failure model may include providing the failure inference engine 122 with a pointer to a representation of the predictive failure model, providing the failure inference engine 122 with data (e.g., coefficients) that is part of the predictive failure model, and/or taking any other action that causes the failure inference engine 122 to execute the predictive failure model.

At stage 260, the standard telemetry data set 205 and the manufacturer-specific telemetry data set 206 are received at the failure inference engine 122. The predictive failure model 204 is then executed by the failure inference engine 122, and a failure risk score 207 for the storage device 134 is generated as a result. The failure risk score 207 is then provided to the risk score analyzer 116. Although in the example of FIG. 2 the predictive failure model is executed based on both the standard telemetry data set 205 and the manufacturer-specific telemetry data set, alternative implementations are possible in which the predictive failure model is executed based on only one of the standard telemetry data set 205 and the manufacturer-specific telemetry data set.

At stage 270, the risk score analyzer 116 processes the failure risk score 207 to determine if a preemptive maintenance action needs to be executed for the storage device 134. If a preemptive maintenance action needs to be performed, the pipeline 200 proceeds to stage 270. Otherwise, if a preemptive maintenance action does not need to be performed, the pipeline 200 returns to stage 210.

In some implementations, to determine whether a preemptive maintenance action needs to be performed for the storage device 134, the risk score analyzer 116 may use a rules database, such as the rules database 300, which is discussed further below with respect to FIG. 3. For example, if the failure risk score 207 falls within a first range, the risk score analyzer 116 may determine that a first preemptive maintenance action needs to be performed. If the failure risk score 207 falls within a second range, the risk score analyzer 116 may determine that a second preemptive maintenance action needs to be performed. And if the failure risk score 207 falls within a first range, the risk score analyzer 116 may determine that no preemptive maintenance action needs to be performed.

At stage 280, the risk score analyzer 116 performs a maintenance action for the storage device 134. As noted above, the maintenance action may include removing the storage device from a RAID array, scheduling service for the storage device 134, and/or any other action that can prevent the data stored on the storage device 134 from being lost.

Figures 3, 4:
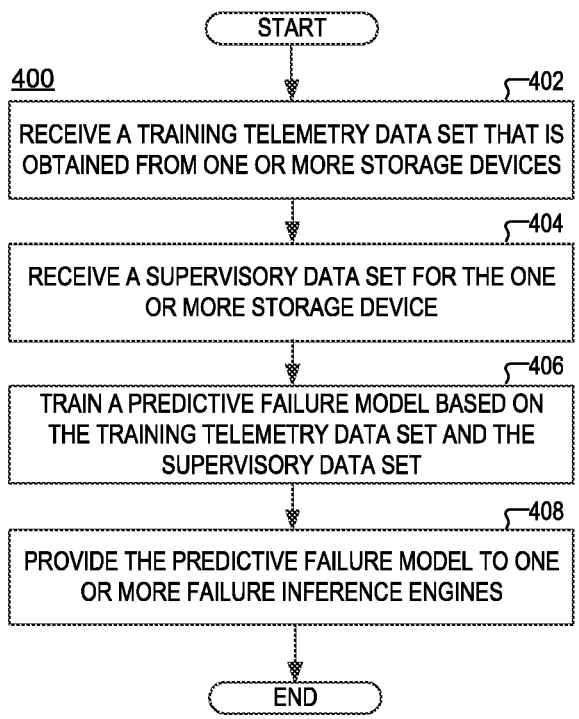
FIG. 3 is a diagram of an example of a database, according to aspects of the disclosure.
FIG. 4 is a flowchart of an example of a process, according to aspects of the disclosure.

FIG. 3 is a diagram of an example of a rules database 300 that can be used by the risk score analyzer 116 to select a service action for the storage device 134. As illustrated, the rules database 300 may include a plurality of entries 310. Each entry may include a respective identifier of a range of values for the failure risk score 207 and an indication of whether any service action needs to be taken with respect to the storage device 134 when the risk score is in that range. According to the present example, entry 310A indicates that when the failure risk score 207 is in a first range, no action needs to be taken with respect to the storage device 134. Entry 310B indicates that when the failure risk score 207 is in a second range, a first preemptive maintenance action needs to be taken with respect to the storage device 134. And entry 310C indicates that when the failure risk score 207 is in a third range, a second preemptive maintenance action needs to be taken with respect to the storage device. The second preemptive maintenance action may be different from the first preemptive maintenance action. Although in the example of FIG. 3, the rules database 300 includes only three entries, it will be understood that alternative implementations are possible in which the rules database 300 includes any number of entries. Stated succinctly, the present disclosure is not limited to any specific implementation of the rules database 300.

FIG. 4 is a flowchart of an example of a process 400 for training a predictive failure model, according to aspects of the disclosure. The process 400 may be executed by one or more of a management system (e.g., the management system 110), a field system (e.g., the field system 120), and/or any other suitable type of computing device. At step 402, a training telemetry data set is obtained from one or more storage devices. The training telemetry data set may include a set of manufacturer-specific telemetry data (that is the same or similar to the set 201, which is discussed above with respect to FIG. 2) and/or a set of standard telemetry data (that is the same or similar to the set 202, which is discussed above with respect to FIG. 2). At step 404, a supervisory data set is obtained that is associated with the one or more storage devices. The supervisory data set may be the same or similar to the supervisory data set 203, which is discussed above with respect to FIG. 3. At step 406, a predictive failure model is trained based on the training telemetry data (received at step 402) and the supervisory data set (received at step 404). In some implementations, the predictive failure model may be trained by using a supervised machine learning algorithm. The predictive failure model may be the same or similar to the predictive failure model 204, which is discussed above with respect to FIG. 4. At step 408, the predictive failure model is provided to one or more failure inference engines.

Figure 5:
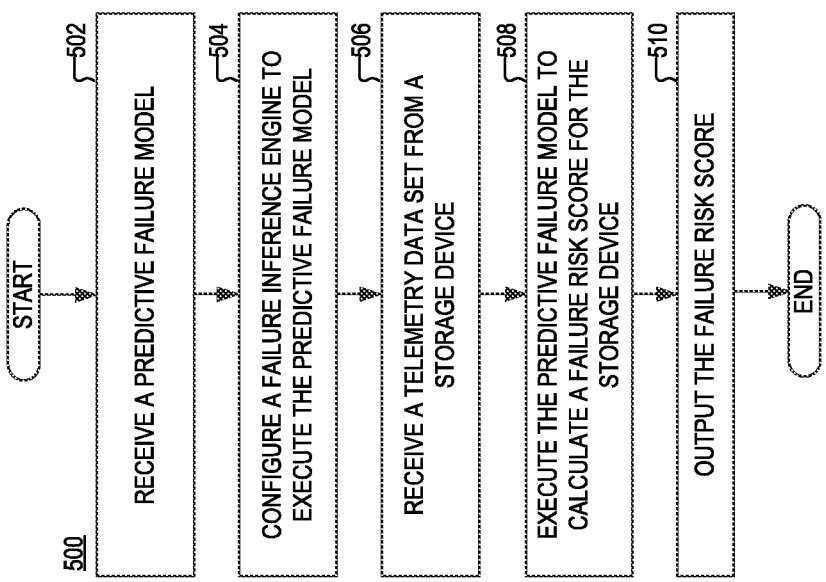
FIG. 5 is a flowchart of an example of a process, according to aspects of the disclosure.

FIG. 5 is a flowchart of an example of a process 500 for calculating a failure risk score for a storage device. The process 500 may be executed by one or more of a management system (e.g., the management system 110), a field system (e.g., the field system 120), and/or any other suitable type of computing device. At step 502, a predictive failure model is received. The predictive failure model may be the same or similar to the predictive failure model 204, which is discussed above with respect to FIG. 2. At step 504, a failure inference engine is configured to execute the predictive failure model. The failure inference engine may be the same or similar to the failure inference engine 122, which is discussed above with respect to FIG. 1. At step 506, a telemetry data set is received from a storage device. The storage device may be the same or similar to the storage device 134, which is discussed above with respect to FIG. 1. At step 508, the failure inference engine calculates a failure risk score for the storage device by executing the predictive failure model based on the telemetry data set. At step 510, the failure risk score is output. In some implementations, outputting the predictive failure score may include rendering the failure risk score on a display device (or another type of output device). Additionally or alternatively, in some implementations, outputting the failure score may include transmitting the failure score over a communications network. Additionally or alternatively, in some implementations, outputting the failure risk score may include providing failure risk score to a risk score analyzer (and/or another software/hardware module) for further processing.

Figure 6:
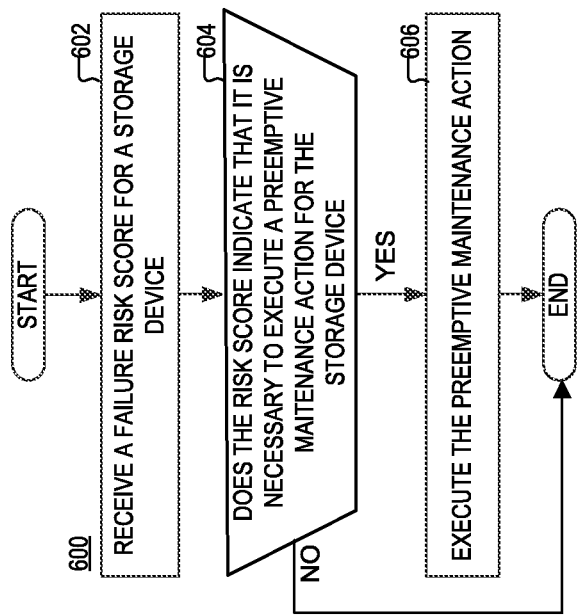
FIG. 6 is a flowchart of an example of a process, according to aspects of the disclosure.

FIG. 6 is a flowchart of an example of a process 600 for processing a failure risk score, according to aspects of the disclosure. The process 600 may be executed by one or more of a management system (e.g., the management system 110), a field system (e.g., the field system 120), and/or any other suitable type of computing device. At step 602, the failure risk score for a storage device is received. The storage device may be the same or similar to the storage device 134, which is discussed above with respect to FIG. 1. At step 604, a determination is made of whether a preemptive maintenance action for the storage device needs to be executed. If a preemptive maintenance action needs to be executed, the process 600 proceeds to step 606. Otherwise, if no preemptive maintenance action needs to be executed, the process 600 ends.

Figure 7:
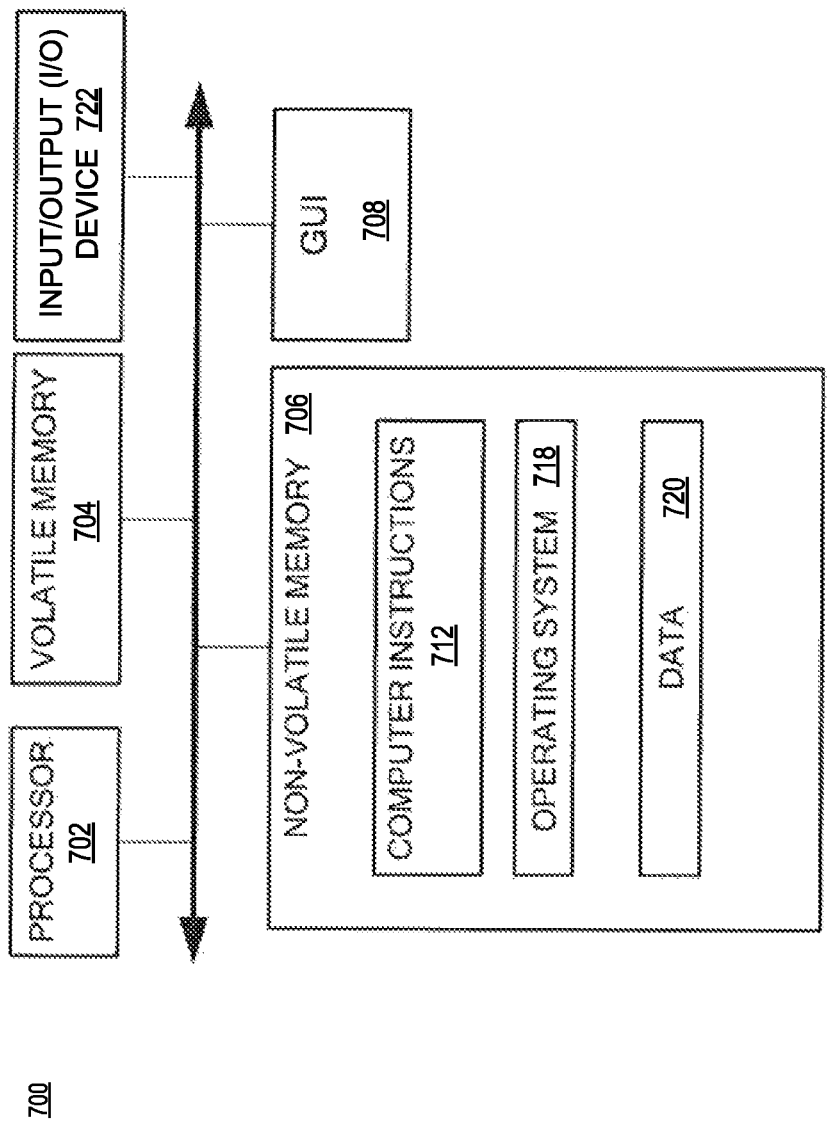
FIG. 7 is a diagram of an example of a computing device, according to aspects of the disclosure.

Referring to FIG. 7, computing device 700 may include processor 702, volatile memory 704 (e.g., RAM), non-volatile memory 706 (e.g., a hard disk drive, a solid-state drive such as a flash drive, a hybrid magnetic and solid-state drive, etc.), graphical user interface (GUI) 708 (e.g., a touchscreen, a display, and so forth) and input/output (I/O) device 722 (e.g., a mouse, a keyboard, etc.). Non-volatile memory 706 stores computer instructions 712, an operating system 718 and data 720 such that, for example, the computer instructions 712 are executed by the processor 702 out of volatile memory 704. Program code may be applied to data entered using an input device of GUI 708 or received from I/O device 722.

Processor 702 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application-specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
retrieving telemetry data from a storage device, the telemetry data including manufacturer-specific data and standard telemetry data;
generating a failure risk score for the storage device, the failure risk score being generated by using a failure inference engine, the failure inference engine being arranged to execute a predictive failure model for calculating the failure risk score; and
outputting the failure risk score for use in servicing the storage device,
wherein the manufacturer-specific data is obtained by using a first collector, the first collector being arranged to provide, to a controller of the storage device, a key for unlocking manufacturer-specific logs that are maintained by the controller, and
wherein the standard telemetry data is obtained by using a second collector.

2. The method of claim 1, further comprising:
providing, to a management system, an identifier corresponding to the storage device;
receiving the predictive failure model from the management system; and
causing the failure inference engine to execute the predictive failure model,
wherein the predictive failure model is selected, by the management system, based on the identifier corresponding to the storage device.

3. The method of claim 1, further comprising:
providing, to a management system, an identifier corresponding to the storage device;
receiving the predictive failure model from the management system; and
causing the failure inference engine to execute the predictive failure model,
wherein the predictive failure model is trained, by the management system, based on training data that is selected based on the identifier corresponding to the storage device.

4. The method of claim 1, wherein the telemetry data identifies one or more of fly height, temperature, duty cycle, and vibration of the storage device.

5. The method of claim 1, wherein outputting the failure risk score include providing the failure risk score to a management system.

6. The method of claim 1, wherein outputting the failure risk score includes providing the failure risk score to a risk score analyzer, the risk score analyzer including logic that is arranged to execute a preemptive maintenance action for the storage device when the failure risk score satisfies a predetermined condition.

7. A system comprising:
a storage device; and
at least one processor operatively coupled to the storage device, the at least one processor being configured to perform the operations of:
retrieving telemetry data from a storage device, the telemetry data including manufacturer-specific data and standard telemetry data;
generating a failure risk score for the storage device, the failure risk score being generated by using a failure inference engine, the failure inference engine being arranged to execute a predictive failure model for calculating the failure risk score; and
outputting the failure risk score for use in servicing the storage device,
wherein the manufacturer-specific data is obtained by using a first collector, the first collector being arranged to provide, to a controller of the storage device, a key for unlocking manufacturer-specific logs that are maintained by the controller, and
wherein the standard telemetry data is obtained by using a second collector.

8. The system of claim 7, wherein the at least one processor is further configured to perform the operations of:
providing, to a management system, an identifier corresponding to the storage device;
receiving the predictive failure model from the management system; and
causing the failure inference engine to execute the predictive failure model,
wherein the predictive failure model is selected, by the management system, based on the identifier corresponding to the storage device.

9. The system of claim 7, wherein the at least one processor is further configured to perform the operations of:
providing, to a management system, an identifier corresponding to the storage device;
receiving the predictive failure model from the management system; and
causing the failure inference engine to execute the predictive failure model,
wherein the predictive failure model is trained, by the management system, based on training data that is selected based on the identifier corresponding to the storage device.

10. The system of claim 7, wherein the telemetry data identifies one or more of fly height, temperature, duty cycle, and vibration of the storage device.

11. The system of claim 7, wherein outputting the failure risk score include providing the failure risk score to a management system.

12. The system of claim 7, wherein outputting the failure risk score includes providing the failure risk score to a risk score analyzer, the risk score analyzer including logic that is arranged to execute a preemptive maintenance action for the storage device when the failure risk score satisfies a predetermined condition.

13. A non-transitory, computer-readable medium storing one or more processor-executable instructions, which when executed by at least one processor further cause the at least one processor to perform the operations of:
retrieving telemetry data from a storage device, the telemetry data including manufacturer-specific data and standard telemetry data;
generating a failure risk score for the storage device, the failure risk score being generated by using a failure inference engine, the failure inference engine being arranged to execute a predictive failure model for calculating the failure risk score; and
outputting the failure risk score for use in servicing the storage device,
wherein the manufacturer-specific data is obtained by using a first collector, the first collector being arranged to provide, to a controller of the storage device, a key for unlocking manufacturer-specific logs that are maintained by the controller, and
wherein the standard telemetry data is obtained by using a second collector.

14. The non-transitory computer-readable medium of claim 13, wherein the one or more processor-executable instructions, when executed by the at least one processor, further cause the at least one processor to perform the operations of:
providing, to a management system, an identifier corresponding to the storage device;
receiving the predictive failure model from the management system; and
causing the failure inference engine to execute the predictive failure model,
wherein the predictive failure model is selected, by the management system, based on the identifier corresponding to the storage device.

15. The non-transitory computer-readable medium of claim 13, wherein the one or more processor-executable instructions, when executed by the at least one processor, further cause the at least one processor to perform the operations of:
providing, to a management system, an identifier corresponding to the storage device;
receiving the predictive failure model from the management system; and
causing the failure inference engine to execute the predictive failure model,
wherein the predictive failure model is trained, by the management system, based on training data that is selected based on the identifier corresponding to the storage device.

16. The non-transitory computer-readable medium of claim 13, wherein the telemetry data identifies one or more of fly height, temperature, duty cycle, and vibration of the storage device.

17. The non-transitory computer-readable medium of claim 13, wherein outputting the failure risk score include providing the failure risk score to a management system.

* * * * *